United States Patent
Locke et al.

(10) Patent No.: US 10,141,884 B2
(45) Date of Patent: Nov. 27, 2018

(54) COOLING FAN FILTERING

(71) Applicant: Dell Products L.P., Round Rock, TX (US)

(72) Inventors: Kevin Locke, Georgetown, TX (US); Travis North, Cedar Park, TX (US); Joohyun Woo, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/460,812

(22) Filed: Mar. 16, 2017

(65) Prior Publication Data

US 2018/0269821 A1   Sep. 20, 2018

(51) Int. Cl.
| | |
|---|---|
| *H02P 27/08* | (2006.01) |
| *H02P 29/60* | (2016.01) |
| *H02P 7/29* | (2016.01) |
| *H02P 5/685* | (2006.01) |

(52) U.S. Cl.
CPC .............. *H02P 29/60* (2016.02); *H02P 5/685* (2013.01); *H02P 7/29* (2013.01)

(58) Field of Classification Search
CPC ......... H02P 2209/09; H02P 27/08; H02P 7/29
See application file for complete search history.

(56) References Cited

U.S. PATENT DOCUMENTS

| | | | | |
|---|---|---|---|---|
| 7,138,781 B2* | 11/2006 | Murray | ................ | G05B 13/024 318/400.04 |
| 7,211,977 B2* | 5/2007 | Squibb | ............... | H05K 7/20209 318/400.08 |
| 8,947,031 B1* | 2/2015 | Diamond | ................ | H02P 29/02 318/400.3 |
| 9,030,146 B2* | 5/2015 | Suzuki | .................... | H02P 23/00 318/254.1 |
| 2014/0152216 A1* | 6/2014 | Suzuki | ...................... | H02P 6/12 318/400.21 |
| 2014/0233176 A1 | 8/2014 | Montero | | |

* cited by examiner

*Primary Examiner* — Bickey Dhakal
(74) *Attorney, Agent, or Firm* — Norton Rose Fulbright US LLP

(57) ABSTRACT

A method for cooling system components of information handling systems may include generating a first pulse width modulation (PWM) control signal for controlling at least one cooling fan configured to cool a system component, filtering the first PWM control signal, and applying the filtered first PWM control signal to the at least one cooling fan. The first PWM control signal may be used to control a component fan and then filtered to generate a filtered first PWM control signal used to control a system fan. The filtering of the control signal may include dampening the control signal such that the control signal is less responsive to temperature changes as the temperature nears a set temperature.

14 Claims, 6 Drawing Sheets

COOLING FAN FILTERING

FIELD OF THE DISCLOSURE

The instant disclosure relates to information handling system cooling systems. More specifically, portions of this disclosure relate to filtering of control signals of cooling systems for information handling systems.

BACKGROUND

As the value and use of information continue to increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM), and other components in information handling systems increase in clock speed and power consumption, the amount of heat produced by such components as a byproduct of normal operation has also increased. The temperatures of these components should be kept within a reasonable range to prevent overheating, instability, malfunction, damage, reduced performance, and shortened component lifespan. Accordingly, cooling systems, which may include cooling fans, blowers, and liquid cooling systems, are included in information handling systems to cool information handling systems and their components.

Cooling fans can be controlled by a proportional-integral-differential (PID) closed-loop control system. Typical PID closed-loop control is based on a mathematical equation summing proportional, integral, and differential terms of a variable (e.g., cooling fan speed, system temperature, component temperature) being controlled. A controller may be used to generate and output a signal, such as a PID control signal, for control of cooling system components, such as cooling fans, in order to keep system parameters within a desired range. The proportional (P) term may be proportional to the magnitude of the error of the output of the controller, the error being the difference between the current output and a desired output. The P term can help to maintain the variable close to a set value of the variable being controlled in steady state, such as maintaining a temperature of an information handling system at a set level. The integral (I) term may be proportional to the magnitude of the error of the output of the controller and the duration of the error. The I term can help to maintain stability when sudden changes in the variable occur at steady state, such as sudden spikes or drops in system temperature. The derivative (D) term may be proportional to the slope of the error of the output over time. The D term can improve settling time and stability of the PID control system. Traditional PID control implementations are prone to oscillation if not properly tuned. Oscillation occurs when a PID controller repeatedly makes changes that are too large, resulting in the controller overshooting a target variable setpoint. Oscillation may be audibly noticeable to an end user by the fans rapidly changing speed. In addition to this acoustic instability, thermal instability may be introduced into the system when incorrectly controlling a cooling fan. Similar shortcomings may be present in other controllers, rather than only in PID controllers.

Shortcomings mentioned here are only representative and are included simply to highlight that a need exists for improved cooling control systems, particularly for cooling control systems employed in information handling systems, such as data centers and personal computing devices. Embodiments described herein address certain shortcomings but not necessarily each and every one described here or known in the art. Furthermore, embodiments described herein may present other benefits than, and be used in other applications than, those of the shortcomings described above.

SUMMARY

Control signals, such as PWM control signals, may be used to control aspects of a cooling system. Filtering control signals can reduce overshoot and oscillation, thus providing for enhanced thermal and acoustic system stability. Such stability may lead to longer life and increased customer satisfaction with an information handling system cooled by the cooling system. Filtering of a signal may include increasing or decreasing a rate of change in the signal over time. One method of filtering a cooling system control signal is to dampen the signal as a temperature level approaches a target value. Dampening the cooling system control signal reduces the responsiveness of the cooling system by decreasing a rate of change of the control signal. Decreasing the responsiveness reduces sudden changes in, for example, air flow and fan speed that would otherwise result from operating the cooling system from a rapidly changing control signal. For example, quick changes in temperature or other variables may cause quick changes in cooling system operation. Dampening the control signal can slightly decouple the response of the cooling system from the temperature or other variable. In one embodiment, as a component or system temperature approaches a target temperature more dampening may be applied. The dampening may be based on feedback of previously generated cooling system control signals.

Cooling in information handling systems can be controlled using different types of control signals. One example control signal is a pulse width modulation (PWM) signal. One method for controlling system cooling may include generating a first PWM control signal for controlling at least one cooling fan configured to cool the system component, filtering the first PWM control signal, and applying the filtered first PWM control signal to the at least one cooling fan. In some embodiments, the first PWM control signal may be used to control a component fan and then filtered to generate a filtered first PWM control signal used to control a system fan. Although PWM control signals are described, other control signals may be used in a cooling system and those control signals may be filtered for changing a response of the cooling system to changing process values such as component temperature.

The method may further include generating the first PWM control signal based, at least in part, on one or more process values. A first process value may be a temperature margin for the system component, and the temperature margin may be used in generating the first PWM control signal. Additional process values, such as a second process value, may be used to generate additional PWM control signals based, at least in part, on the additional process values. The multiple process values may be used to generate multiple PWM control signals. Some of the control signals may be filtered. The filtered and unfiltered control signals may be compared and one of the control signals selected for controlling the cooling system. For example, a second unfiltered PWM control signal may be compared to a filtered first PWM control signal, and the greater of the second PWM control signal and the filtered first PWM control signal may be applied to control the cooling system or part of the cooling system, such as a component fan or a system fan. The comparison process may improve the likelihood that the system as a whole is properly cooled by taking into consideration cooling demands of multiple components within the system.

The filtering of the control signal may include dampening the control signal as a target process value is approached. The target process value may include a temperature or a temperature margin. In some embodiments, the step of dampening may include adding a feedback of the filtered first PWM control signal to a gain parameter multiplied by a second parameter proportional to a difference between the first PWM control signal and the feedback of the filtered first PWM control signal. Reducing the gain parameter of such a filter as a target process value is approached may further dampen and stabilize the filtered PWM control signal.

An apparatus for cooling a system component of an information handling system may include at least one cooling fan configured to cool the system component and a controller coupled to the at least one cooling fan to apply a filtered first PWM control signal to the at least one cooling fan. The controller may be configured to perform steps corresponding to those described above and may include a proportional-integral-derivative (PID) controller. The controller may be configured to perform steps for controlling at least one cooling fan configured to cool a system component similar to those described above.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
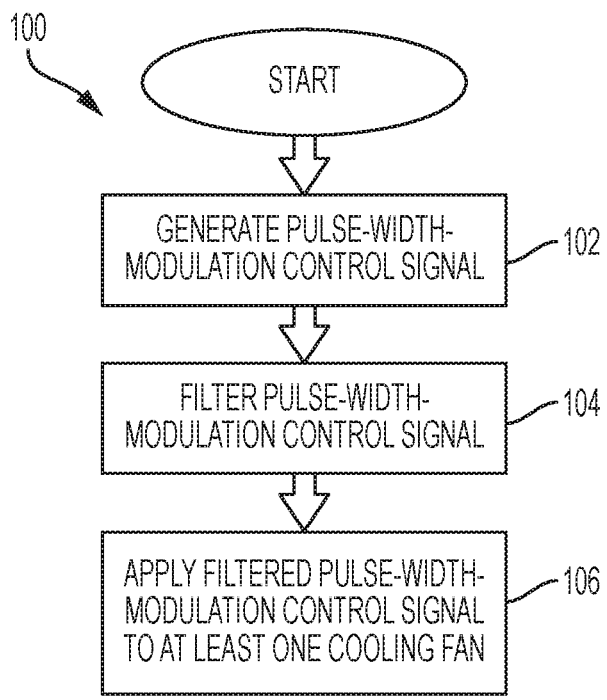
FIG. 1 is a flow chart illustrating an example method of controlling a cooling system for a system component of an information handling system according to some embodiments of the disclosure.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling systems may include cooling systems for controlling the environment in the information handling system and around equipment therein. An information handling system may provide a controlled environment, such as a data center, a personal computer enclosure, or a mobile device enclosure, that may be monitored, and cooling systems may be controlled to regulate environmental conditions inside the information handling system to certain specifications. Furthermore, cooling systems may be controlled to regulate temperatures of specific system components of information handling systems. For example, a temperature and/or a humidity of the information handling system or a system component may be monitored and the cooling systems controlled, such as by activating, de-activating, and adjusting operating parameters thereof, to keep the temperature and/or the humidity in a desired range. Further, conditions outside the device may be monitored and used as part of a control system for the cooling systems.

Both system fans and component fans, such as CPU fans, memory fans, video card fans, controller fans, and the like, may be used for cooling system components. When a temperature sensor reads an increase in temperature, a variety of system and component fans coupled to the temperature sensor may be controlled to compensate for the increase. For example, a CPU fan and a variety of system fans may be used to cool a CPU. When a temperature change occurs, multiple fans may be activated, deactivated, or adjusted faster or slower at the same time. Adjusting multiple fans simultaneously can result in large increases or decreases in airflow through the information handling system. These large changes in airflow can cool the component more than is necessary and may lead to oscillation that negatively impacts system performance and can be bothersome to a user. For example, insufficient cooling can leave a component in danger of overheating, and the rapid changes in airflow are acoustically noticeable and distracting to a user.

PID controllers may be used in fan control for information handling systems. PID control may operate to prevent a process value, such as component temperature, from exceeding a target process value, such as a target component temperature or maximum component temperature. An error, such as a difference between a target process value and process value, may be used in calculating the P, I, and D components of the PID control signal for generation of the PID control signal. The P term (being proportional to error) ensures that the process variable will be close to the set point at steady state. The I term (being proportional to summation of error over time) ensures stability under sudden change at steady state. The D term improves settling time and stability of the control. If the process value is below the target process value the P and I components of the PID signal will always be negative, and negative PID control signal components can reduce fan speed. However, even if the P and I components of the PID signal are negative, the D term may be positive due to an increase in process value. If the process value increases, while remaining below the target process value, the D term may be positive causing an increase in fan speed and counteracting the reduction in fan speed otherwise caused by the negative P and I terms. If the process value decreases, the D term may be negative, joining with the negative P and I terms to produce a negative output and reduce fan speed. Thus, in cooling system control, the P and I terms will generally remain negative while the D term may be negative or positive.

PID controllers may introduce thermal and acoustic instability into the cooling system by overshooting target variable setpoints, causing oscillation around the target variable. A PID control signal generated by a controller may be altered to reduce instability and increase system efficiency by adjusting the signal for application to a specific fan based on parameters specific to a system fan and filtering the signal. Generation, adjustment, and filtering of the control signal may be linear or nonlinear, meaning the system may return a constant increase in output for each unit increase in input or the output may increase and decrease at a variable rate for each unit increase in input.

FIG. 1 is a flow chart illustrating an example method 100 for operating a cooling system of an information handling system according to some embodiments of the disclosure. The method 100 may begin with generation of a fan control signal, such as a pulse-width-modulation (PWM) control signal, at step 102. A fan control signal may also be another form of control signal such as linear voltage regulation signal. The signal may be filtered at step 104 before being applied to at least one cooling fan at step 106.

Figure 2A:
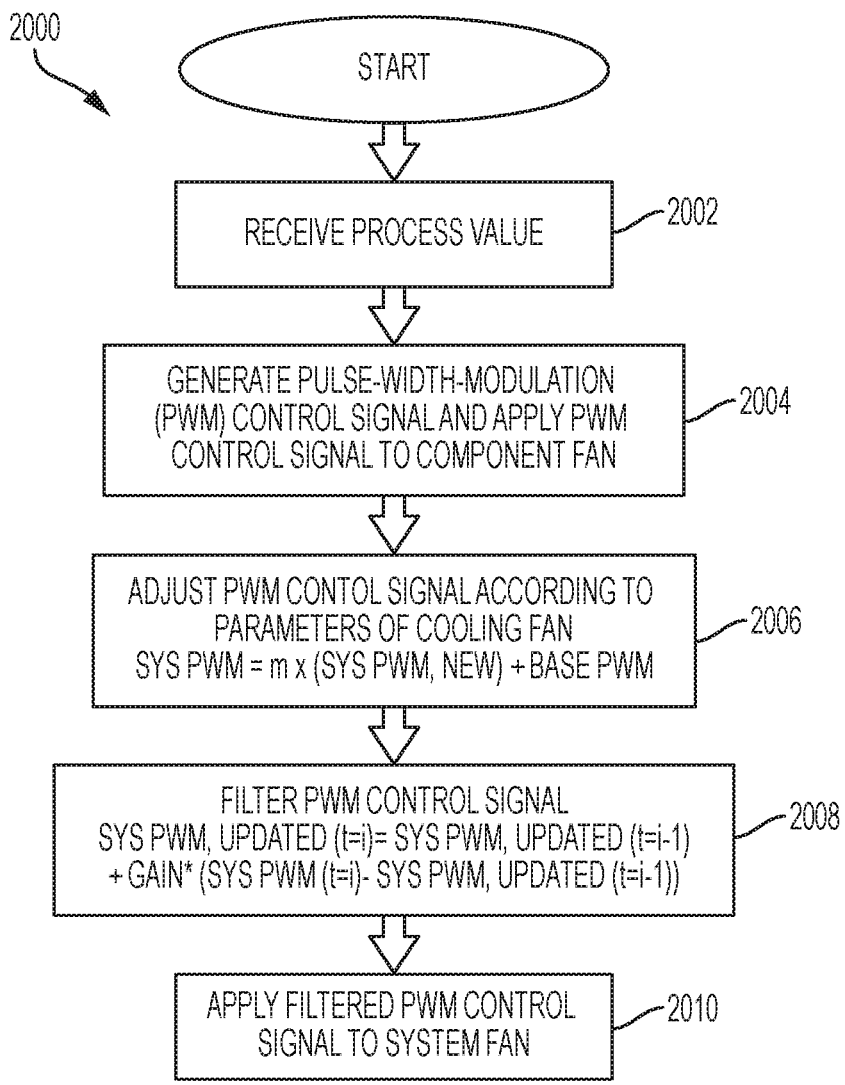
FIG. 2A is a flow chart illustrating an example method of controlling a cooling system for a system component of an information handling system according to some embodiments of the disclosure.

The generated signal may be adjusted and/or filtered for application to system and component fans. FIG. 2A is a flow chart illustrating an example method 2000 for operating a cooling system of an information handling system according to some embodiments of the disclosure. The method 2000 may begin with receiving a process value at step 2002. A variety of process values may be received as a first process value (e.g., CPU margin, memory margin, hard drive margin, PCIe peripheral margin). The received process value may be a system temperature margin or a temperature margin for a specific component of the information handling system. A temperature margin is a value indicating a difference between a temperature of a component or system and the maximum temperature tolerance of the component or system. For example, a CPU margin may be a difference between a junction temperature of a CPU and an actual temperature of the CPU. Another margin value related to the distance between the component temperature or system temperature and the maximum component temperature or maximum system temperature may also be used. In some embodiments, the process value may be an actual component or system temperature. In some embodiments, the process value may be collected and logged in a memory.

At step 2004, a PID controller may generate a first PWM control signal. A PWM control signal may be any signal related to a PWM control signal, for example, a change in a PWM control signal. The first PWM control signal may be based on a CPU temperature margin and may be generated based on parameters of a CPU component cooling fan (e.g., fan diameter). Alternatively, the first PWM control signal may be based on another process value, such as a hard drive temperature margin or system temperature margin, and may be generated based on parameters of another cooling fan such as a system fan. Then, at step 2006, the first PWM control signal may be adjusted based on the parameters of a cooling fan different from the fan for which the first PWM control signal was originally generated. For example, a control signal that was generated based on a CPU temperature margin for a CPU component cooling fan may be adjusted based on the parameters of a system cooling fan such that the control signal may be applied to the system cooling fan. Adjusting a previously generated PID control signal for application to a system cooling fan instead of generating a new PID control signal for application to the system cooling fan can reduce processing requirements of the system because a single signal is being generated and adjusted instead of, for example, generating two separate PID control signals for a component fan and a system fan.

Parameters of a cooling fan may vary depending on the specific characteristics of the fan such as its size, efficiency, acoustics, and speed and may also vary depending on where the fan is placed in the information handling system. For example, a first fan may be located where a barrier, such as a shroud or divider, is between the fan and the component to be cooled, thus reducing airflow to the component generated by the fan. A second fan may have a direct path to the component to be cooled. In such a system, a greater portion of air flow generated by the second fan, such as eighty percent, may aid in cooling the component while a lesser portion of air flow generated by the first fan, such as twenty percent, may aid in cooling the component. Thus, a speed of the second fan may be increased at a rate greater than a speed of the first fan by controlling the "m" parameter in the example formula of block 2006. As another example, a fan may be placed at a location far from the system component, which reduces the effect of the fan on the airflow at the component. As a further example, a first system fan may be located close to a user towards the front of the system, while a second system fan may be located farther from the user towards the back of the system. The first fan, when sped up, may create noise that is more noticeable to a user than the second fan. In this example, the PWM control signal may be adjusted at block 2006 by increasing a magnitude of a signal delivered to the second fan and/or decreasing a magnitude of a signal delivered to the first fan. The adjustment of the first PWM control signal may cause the speed of the second system fan to increase prior to increasing the speed of the first system fan to minimize noticeable acoustic effects of such an increase on the user. Combinations of different fan speeds on a plurality of cooling fans may also have negative acoustic effects, such as increased fan noise. In such cases, the adjustment of the first PWM control signal may mitigate the negative acoustic effects.

Adjustment of the control signal at block 2006 may involve multiplying a modifier, determined based on the specific parameters of the fan for which the signal is being adjusted, such as a system fan, by the generated first PWM control signal and adding that value to a base PWM value. Alternatively, the modifier may be multiplied by a change in the first PWM control signal, and the product may be added to a base PWM value. Adjusting the first PWM control signal by application of the modifier may comprise using a linear or non-linear function. The first PWM control signal that was originally generated for control of a CPU component fan may be adjusted to control a system fan such that the adjusted control signal creates approximately similar airflow in the system fan as the first PWM control signal creates in the CPU fan. When the component fan and the system fan are of a substantially similar size and performance, substantially similar airflow may be realized by adjusting the PWM control signal to create substantially similar RPM values in the CPU fan and the system fan. Adjustment of the PWM control signal based on the specific fan for which the signal is being adjusted can help to optimize both cooling system acoustics and cooling performance.

After a first PWM control signal is adjusted at block 2006, the first PWM control signal may be filtered at step 2008. The filtering step may dampen the first PWM control signal, thereby limiting increases and decreases in fan speed allowing for a smoother and more stable thermal and acoustic profile. Dampening the first PWM control signal may include reducing the responsiveness of the signal to rapid changes in temperature, thereby inhibiting rapid changes in fan speed over short periods of time in response to sharp increases or decreases in temperature while maintaining a steady progression toward a target process value. The dampening of the signal may create a result similar to a high I term of the PID controller when a temperature is near the target process value and a decreasing I term as the temperature drops below the target process value. Thus, the I term of the PID control signal may be reduced and its functionality replaced, in part, by the implementation of the filter. Although examples of PID controller functionality are provided, operation of the filtering of a fan PWM control signal does not require a PID controller. PID control is only one non-limiting example of a technique for generating the fan PWM control signal.

The signal may be dampened at block 2008 using a linear or non-linear function having a gain parameter or another coefficient that may be a constant value or may decrease as a target process value is approached. The gain parameter may, in some embodiments, be a value between zero and one and may be proportional to the distance between the target process value and a first process value. A lower gain parameter may dampen the control signal more than a higher gain parameter. The gain parameter and its potential modification as the target process value is approached may be tailored to the specific fan for which the filtered first PWM control signal is being adjusted and filtered, such as a system or component fan. The target process value may, for example, include a target system temperature margin, component temperature margin, a target system temperature, or a target component temperature. In some embodiments, the first PWM control signal may be filtered by feeding back the filtered first PWM control signal and adding that signal to the gain parameter multiplied by a second parameter proportional to a difference between the current first PWM control signal and the fed back filtered first PWM control signal.

At step 2010, the filtered first PWM control signal may be applied to the appropriate fan to control fan operation. For example, a PWM control signal generated based on a CPU margin may be adjusted based on system fan parameters, filtered, and applied to control a fan speed of a system fan to satisfy CPU cooling requirements. Alternatively or additionally, a PWM control signal generated for a system fan based on a hard drive temperature margin may be filtered and applied to the system fan.

In some embodiments, the first PWM control signal may be a PWM control signal for a component fan, such as a CPU fan, and may be generated based on a component process value, such as a CPU temperature margin. In such embodiments, the first PWM control signal may be applied directly to the component fan, at step 2004, in addition to being adjusted and filtered, at steps 2006 and 2008 before being applied to a different component fan or a system fan. Alternatively, the first PWM control signal may be filtered prior to being applied to the component fan, without any other adjustment.

Multiple process values (such as temperatures) corresponding to multiple components may be considered when generating a PWM control signal for application to a cooling fan. In one example, a separate PWM control signal may be generated for each process value and an algorithm applied to each of the generated PWM control signals to determine a final PWM control signal as described with reference to FIG. 2B. Multiple process values may be received at step 2102. The process values may be inputs from one or more additional system components, such as input from a sensor linked to a system fan or a temperature or temperature margin of a system component (e.g., memory, PCIe peripheral, or hard drive temperature). Multiple PWM control signals may be generated based on the received process values at step 2104. Such PWM control signals, may be generated by a PID controller, may be recalled from a memory, or may be generated by another control signal generation mechanism. The generated PWM control signals may then be adjusted and/or filtered, as described above regarding the first PWM control signal. In some embodiments, one of the plurality of generated PWM control signals may be adjusted and/or filtered while the remaining signals are not. The PWM control signals may then be compared at step 2106. The largest of the compared signals may be applied to a system fan at step 2108. Alternatively, the largest of the compared signals may be applied to a component fan that is located to cool the one or more additional system components. Thus, a PWM control signal for a system or component fan may be selected and applied based on temperature data from a plurality of system components that are cooled by the fan. Such comparison can allow for cooling requirements of multiple system components to be met. System fans may be run at the maximum required level to provide sufficient cooling to all system components to which they are linked. Although a maximum function is described for selecting a PWM control signal at step 2108, other selection algorithms may be used. For example, the comparison of PWM control signals at step 2106 may involve calculating an average of the PWM control signals and applying that average at step 2108.

Figure 3:
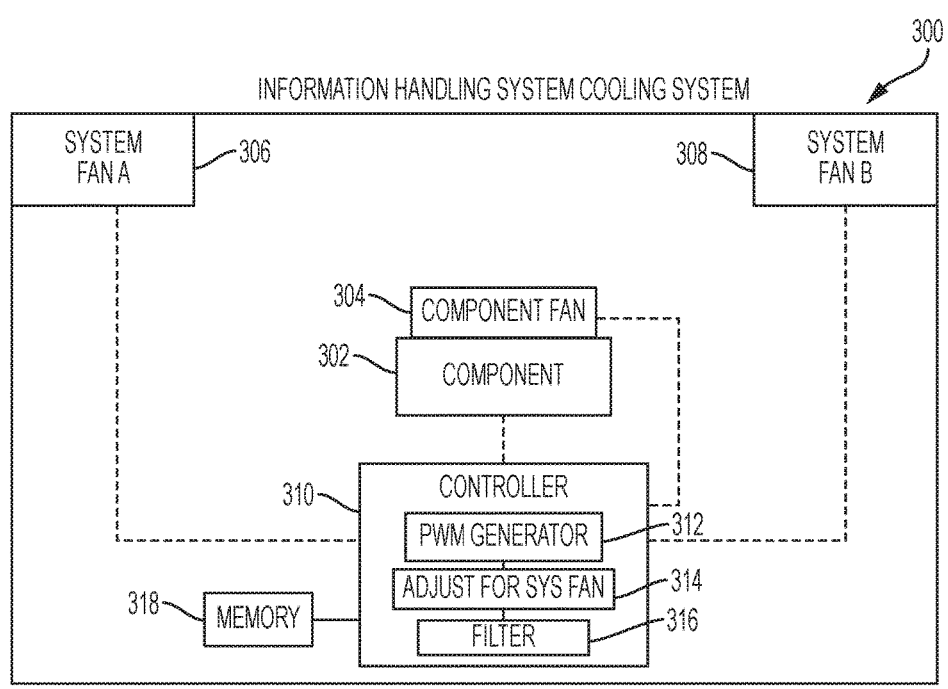
FIG. 3 is a block diagram illustrating a cooling system for a system component of an information handling system according to some embodiments of the disclosure.

FIG. 3 is a block diagram illustrating an information handling system cooling system 300 according to some embodiments of the disclosure. An information handling system cooling system may be configured to cool a system component 302, such as a CPU, a hard drive, memory, video card, or other system component. The component 302 may be cooled by a component fan 304 and a variety of system fans such as system fan A 306 and system fan B 308. Additional system and component fans may also be present. A fan controller 310, such as an embedded controller attached to a motherboard, may be coupled to the component or a sensor proximate to the component to monitor a process value such as a component temperature margin of the component 302. For example, the fan controller 310 may be coupled to a temperature diode integrated in a CPU die or may be coupled to a thermal management sensor integrated in a CPU die. The fan controller 310 may be further coupled to the component fan 304, system fan A 306, and system fan B 308. The controller 310 may be further coupled to memory 318 for storing information about the component 302 and system 300 such as process values and parameters. The fan controller 310 may be a programmable logic controller (PLC) or microprocessor and may include a pulse-width-modulation (PWM) generator 312 to generate one or more PWM control signals for cooling fans such as system fan A 306, system fan B 308, and/or component fan 304. The PWM generator 312 may include a PID controller. The fan controller 310 may further include an adjuster 314 to adjust the PWM control signal to the parameters of a specific fan to be controlled. The fan controller 310 may include a filter 316 configured to filter one or more of the PWM control signals before it is applied to a cooling fan. The fan controller 310 may be configured to perform steps of generating, altering, and filtering, performed by the PWM generator 312, adjuster 314, and filter 316, a PWM control signal before applying the signal to the applicable fan. Although PWM generator 312, adjuster 314, and filter 316 are show as physical blocks inside the fan controller 310, these blocks may represent hardware, software, or a combination of software and hardware that perform the described functions.

Figure 4:
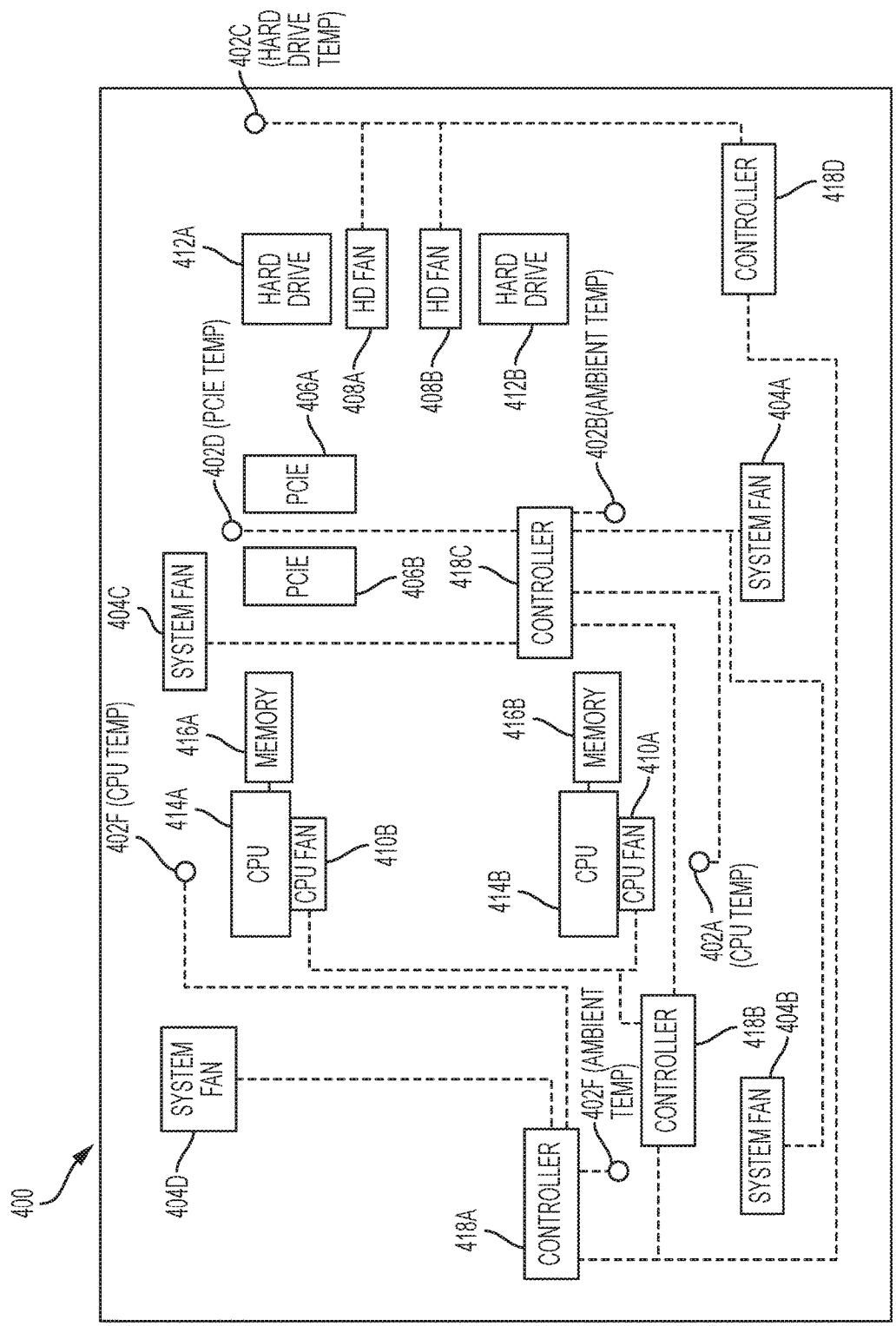
FIG. 4 is a diagram illustrating components of a cooling system in an information handling system according to some embodiments of the disclosure.

FIG. 4 is a block diagram illustrating an information handling system 400 according to some embodiments of the invention. An information handling system 400 may include sensors designed to collect data as to the environment of the information handling system, such as temperature sensors 402A-F. The system 400 may also include system cooling fans such as system fans 404A-D, and component cooling fans such as CPU fans 410A-B and hard drive fans 408A-B. The system 400 may include one or more system components such as CPUs 414A-B, hard drives 412A-B, peripheral component interconnect express (PCIe) peripherals 406A-B, such as video cards, and memory units 416A-B. The system 400 may also include controllers, such as controllers 418A-D. The controllers 418A-D may receive data from the sensors in the form of process values. The controllers may generate, adjust, and/or filter control signals for control of the system and component fans based, at least in part on the data obtained from the temperature sensors. Controllers 418A-D may be contained in a single chip configuration or may be located on separate chips. Controller 418B may be a master controller and may control operation of controllers 418A and 418C-D.

Figure 5:
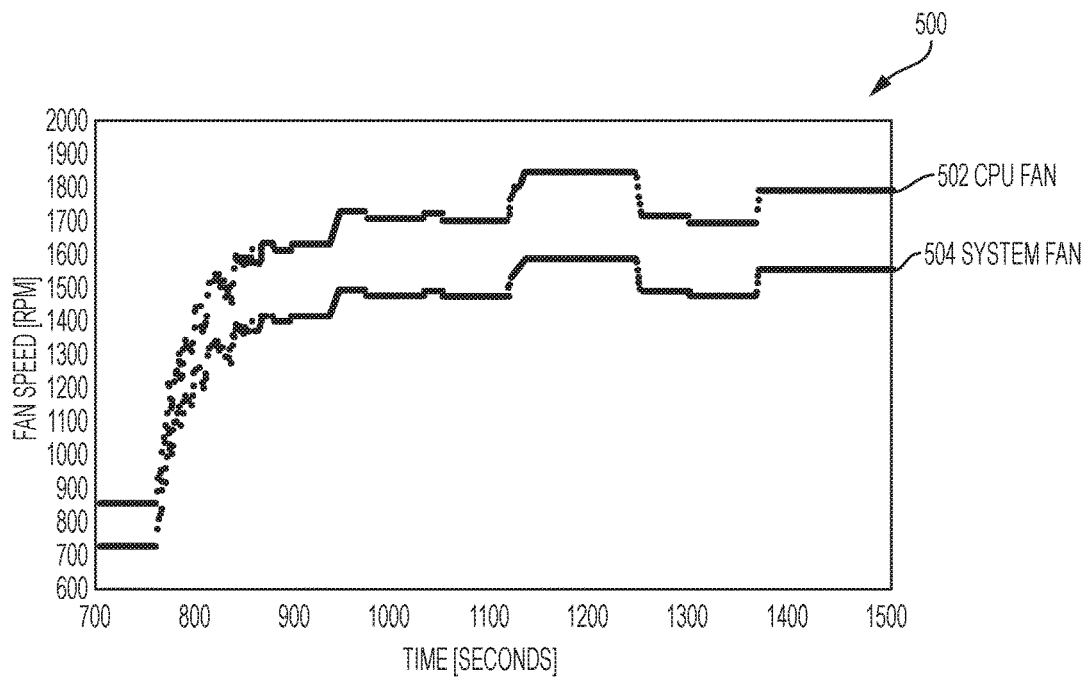
FIG. 5 is a graph illustrating a fan speed over time for a CPU fan and a system fan of an information handling system controlled with an unfiltered PID control signal.
Figure 6:
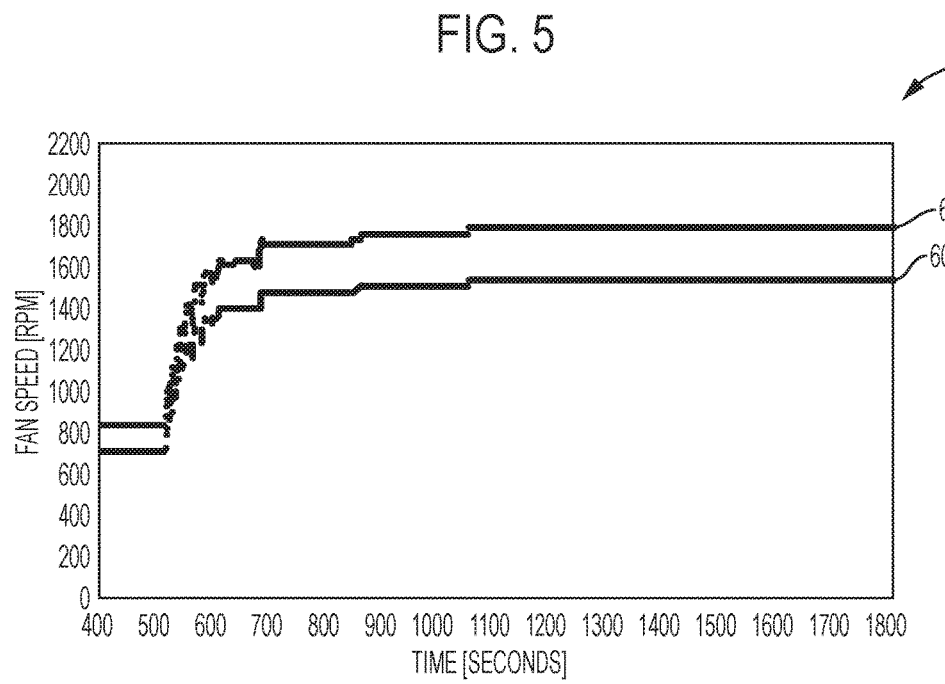
FIG. 6 is a graph illustrating fan speed over time for a CPU fan and a system fan of an information handling system controlled with a filtered PID control signal according to some embodiments of the disclosure.

FIG. 5 is a graph illustrating a fan speed response of a CPU fan 502 and a fan speed response of a system fan 504, in RPM, over time when no filtering is applied to a PWM control signal generated by a PID controller and applied to a cooling fan. FIG. 6 illustrates a fan speed response of a CPU fan 602 and a system fan 604, in RPM, over time when filtering is applied to the PWM control signal. The oscillation in fan speed over time present in FIG. 5 is minimized when filtering is applied, resulting in enhanced system stability and performance.

Figure 2B:
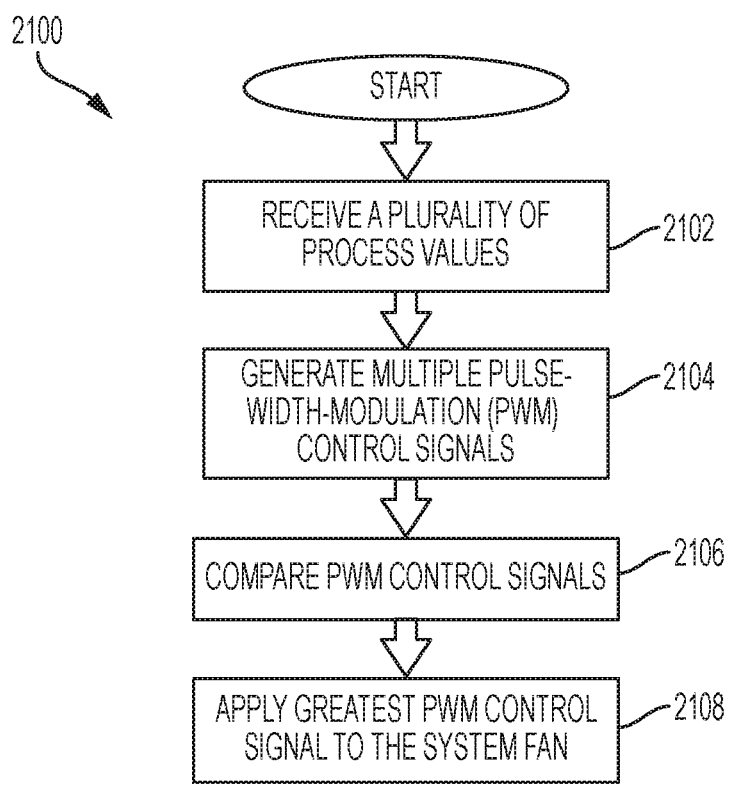
FIG. 2B is a flow chart illustrating an example method of controlling a cooling system for a system component of an information handling system according to some embodiments of the disclosure.

The schematic flow chart diagrams of FIG. 1 and FIGS. 2A-B are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for cooling a system component of an information handling system, comprising:
    generating a first pulse width modulation (PWM) control signal for controlling at least one cooling fan configured to cool the system component;
    filtering the first PWM control signal to obtain a filtered first PWM control signal, the filtering comprising dampening the first PWM control signal such that a rate of change of the filtered first PWM control signal is decreased as a target process value is approached; and
    applying the filtered first PWM control signal to the at least one cooling fan,
    wherein the step of dampening the first PWM control signal comprises feeding back the filtered first PWM control signal to generate a new first PWM control signal by adding the filtered PWM control signal to a product of a gain parameter multiplied by a second parameter proportional to a difference between the first PWM control signal and the filtered first PWM control signal, and wherein the method further comprises applying the new first PWM control signal to the at least one cooling fan.

2. The method of claim 1, further comprising receiving a first process value, wherein the first PWM control signal is generated based, at least in part, on the first process value.

3. The method of claim 2, wherein the first process value comprises a temperature margin, and wherein generating the first PWM control signal is based, at least in part, on the temperature margin.

4. The method of claim 2, further comprising:
    receiving a second process value;
    generating a second PWM control signal based, at least in part, on the received second process value;
    comparing the second PWM control signal to the filtered first PWM control signal; and
    applying a greater of the second PWM control signal and the filtered first PWM control signal to the at least one cooling fan.

5. An apparatus for cooling a system component of an information handling system, the apparatus comprising:
    at least one cooling fan configured to cool the system component; and
    a controller coupled to the at least one cooling fan to apply a filtered first PWM control signal to the at least one cooling fan,
    wherein the controller is configured to perform steps for controlling the at least one cooling fan comprising:
    generating a first pulse width modulation (PWM) control signal for controlling the at least one cooling fan; and
    filtering the first PWM control signal to generate the filtered first PWM control signal, the filtering comprising dampening the first PWM control signal such that a rate of change of the filtered first PWM control signal is decreased as a target process value is approached,
    wherein the step of dampening the first PWM control signal comprises generating a new PWM control signal by adding the filtered first PWM control signal to a product of a gain parameter multiplied by a second parameter proportional to a difference between the first PWM control signal and the filtered first PWM control signal, and wherein the controller is further configured to apply the new PWM control signal to the at least one cooling fan.

6. The apparatus of claim 5, wherein the controller is further configured to apply the first PWM control signal to a component fan.

7. The apparatus of claim 5, wherein the controller is further configured to perform steps comprising: receiving a first process value and generating the first PWM control signal based, at least in part, on the first process value.

8. The apparatus of claim 7, wherein the first process value includes a temperature margin and wherein the first PWM control signal is generated based, at least in part, on the temperature margin.

9. The apparatus of claim 7, wherein the controller is further configured to perform steps comprising:
    receiving a second process value;
    generating a second PWM control signal, based, at least in part, on the second process value;
    comparing the second PWM control signal to the filtered first PWM control signal; and
    applying a greater of the second PWM control signal and the filtered first PWM control signal to the at least one cooling fan.

10. The apparatus of claim 5, wherein the controller comprises a proportional-integral-derivative (PID) controller.

11. An apparatus, comprising:
    a controller configured to performs steps for controlling at least one cooling fan configured to cool a system component comprising:
    generating a first pulse width modulation (PWM) control signal for controlling the at least one cooling fan;
    filtering the first PWM control signal to obtain a filtered first PWM control signal, the filtering comprising dampening the first PWM control signal such that a rate of change of the filtered first PWM control signal is decreased as a target process value is approached; and
    applying the filtered first PWM control signal to the at least one cooling fan,
    wherein the step of dampening the first PWM control signal comprises generating a new first PWM control signal by adding the filtered first PWM control signal to a product of a gain parameter multiplied by a second parameter proportional to a difference between the first PWM control signal and the filtered first PWM control signal, and wherein the controller is configured to apply the new first PWM control signal to the at least one cooling fan.

12. The apparatus of claim 11, wherein the controller is further configured to perform a step of receiving a first process value, and wherein the first PWM control signal is generated based, at least in part, on the first process value.

13. The apparatus of claim 12, wherein the first process value includes a temperature margin, and wherein the first PWM control signal is generated based, at least in part, on the temperature margin.

14. The apparatus of claim 12, wherein the controller is further configured to perform steps comprising:
   receiving a second process value;
   generating a second PWM control signal based, at least in part, on the second process value;
   comparing the second PWM control signal to the filtered first PWM control signal; and
   applying a greater of the second PWM control signal and the filtered first PWM control signal to the at least one cooling fan.

* * * * *